(12) United States Patent
Bales (10) Patent No.: US 6,264,016 B1
(45) Date of Patent: Jul. 24, 2001

(54) MOBILE POWER CENTER WITH SELF-RETRACTING CORD

(76) Inventor: Scott Bales, Box 14, Site 2, RR. 2, Sundre, Alberta (CA), T0M 1X0

( * ) Notice: Subject to any disclaimer, the term of this patent is extended or adjusted under 35 U.S.C. 154(b) by 0 days.

(21) Appl. No.: 09/466,258

(22) Filed: Dec. 17, 1999

(51) Int. Cl.[7] .................................................. H02G 11/02
(52) U.S. Cl. .......................................................... 191/12.4
(58) Field of Search ............................ 191/12 R, 12.2 R, 191/12.4; 242/390.8, 391, 400, 400.1; 248/329

(56) References Cited

U.S. PATENT DOCUMENTS

| | | | |
|---|---|---|---|
| 3,837,448 | * 9/1974 | Hagstrom | 191/12.4 |
| 4,467,979 | 8/1984 | Koehler | 242/96 |
| 4,585,194 | 4/1986 | Schwob | 248/52 |
| 5,056,698 | * 10/1991 | Kozakevich | 191/12.2 R |
| 5,255,767 | * 10/1993 | Norwood | 191/12.2 R |
| 5,657,841 | * 8/1997 | Morvan | 191/12.4 |
| 5,669,471 | * 9/1997 | Unze | 191/12.2 R |
| 5,803,216 | * 9/1998 | McNaught | 191/12.4 |
| 5,819,894 | * 10/1998 | Okamoto | 191/12.4 |

\* cited by examiner

Primary Examiner—Mark T. Le
(74) Attorney, Agent, or Firm—David S. Thompson (57) ABSTRACT

A mobile power center with self-retracting cord includes an enclosure having a mounting surface which is attachable to the bumper of a vehicle and a front surface having a recessed area for attachment of a license plate. Within the enclosure, a reel carries an extension cord on a spring-powered spindle that allows manual extension and automatic retraction of the cord. Where the length of the cord exceeds the length which may be carried by the reel, first and second cord restraints, carried on opposed sides of the enclosure, support additional cord wrapped around the enclosure. The first and second three-prong sockets of a dual socket receptacle are wired in parallel to the inner end of the extension cord. In a first mode of operation, a block heater, mounted on the vehicle, may be plugged into a first socket, while a trouble light or tool may be plugged into the second socket. AC power from a remote source is supplied by the extension cord. In a second mode of operation, a 12 VDC to 120 VAC converter, mounted in the engine compartment and powered by the vehicle, may be plugged into a recessed male receptacle. A tool or light may then be plugged into either socket of a standard female receptacle. Where an electrical load is remotely located, the outer end of the extension cord may be extended, with a female to female adapter attached, thereby providing power to the remote load.

5 Claims, 7 Drawing Sheets

MOBILE POWER CENTER WITH SELF-RETRACTING CORD

CROSS-REFERENCES

There are no applications related to this application filed in this or any foreign country.

BACKGROUND

Retractable electrical extension cord units are well-known, and have been incorporated in known applications. U.S. Pat. No. 4,467,979, issued Aug. 28, 1984 to Koehler, is an example. Such a cord retraction device allows the cord to be extended only to the degree desired, thereby resulting in a neater appearance, improved safety and protection for the cord not currently used. After use, the cord is then retracted in a convenient manner that protects the cord and enhances appearance.

Similarly, it is known that a license plate holder may be constructed with a cord reel, and that the cord stored on the reel may be used to manually extend and manually retract an electrical electrical plug. U.S. Pat. No. 5,056,698, issued Oct. 15, 1991 to Kozakevich and U.S. Pat. No. 5,255,767, issued Oct. 26, 1993 to Norwood, are both examples.

However, known license plate holders having a cord reel have failed to provide a number of structures which support functionality that would be useful to many motorists, hunters, fishermen, outdoorsmen and many others. For example, known license plates having a reel for electrical cord have failed to provide structures which are adapted for use with either a 120 VAC powered vehicle block heater and also with a 12 VDC to 120 VAC converter.

Similarly, where the vehicle is equipped with a 12 VDC to 120 VAC converter, known license plate holders having an electrical cord reel have failed to provide structures which assist in plugging distant devices into the 120 VAC power sources.

Also, known license plate holders having an electrical cord reel have failed to provide the structures needed to store additional cord, where the built-in reel is insufficient to support the required length of electrical cord. Known devices have also failed to provide a spring-loaded device to retract the cord, and have failed to provide a device to clean the cord as it retracts.

For the foregoing reasons, there is a need for an automatic retractable electrical cord that can be adapted for use with either a block heater or a 12 VDC to 120 VAC converter. The electrical cord assembly should automatically retract and clean the cord. The device should also be adapted for both acquiring and for distributing power. Additionally, the mobile power center with self-retracting cord should provide additional structures which allow the storage of additional cord when required.

SUMMARY

The present invention is directed to an apparatus that satisfies the above needs. A mobile power center with self-retracting cord is disclosed that is adapted for use with either a block heater or a 12 VDC to 120 VAC converter, the electrical cord assembly should also be adapted for both acquiring and for distributing power, and additional structures should allow the storage of additional cord when required.

The mobile power center with self-retracting cord of the present invention provides some or all of the following structures.

(A) An enclosure 20 is sized for mounting on a vehicle's front bumper, and provides a front plate which is typically recessed to support a license plate.

(B) A spring-loaded reel 50 is carried within the enclosure. The reel allows an extension cord 70 to be extended to a desired length, or retracted for storage. The spring is tightened as the extension cord is extended, thereby providing the power to retract the cord back onto the reel.

(C) A dual socket receptacle is carried in a side panel of the enclosure, and allows two standard, three-prong AC plugs to be inserted. Both sockets are electrically connected to the inner end of the extension cord.

(D) At least one block heater 200 is mounted on the engine, and provides an electrical plug which may be inserted into at least one socket of the dual socket receptacle.

(E) A 12 VDC to 120 VAC converter is mounted within the engine compartment, where it is connected to the 12 VDC and ground sides of the vehicle's electrical system. The 12 VDC to 120 VAC converter supplies power through a short extension cord which may be inserted into a recessed male plug carried by the enclosure.

(F) A female to female adapter 80 allows the extension cord to be used as a source of power for tools or other devices in the circumstance where an extension cord supplies power from a 12 VDC to 120 VAC converter to the mobile power center.

(G) A preferred cord restraint provides rounded handles extending from the left and right sides of the enclosure. This allows an additional extension cord to be wrapped around the outside of the enclosure, and kept in place by the cord restraint.

It is therefore a primary advantage of the present invention to provide a novel mobile power center with self-retracting cord having an enclosure which conceals an electrical extension cord within an attractive license plate holder, and which allows the electrical cord to be extended as needed to reach an AC socket, and which provides an AC socket into which may be plugged one or more block heaters.

Another advantage of the present invention is to provide a mobile power center with self-retracting cord which provides a 12 VDC to 120 VAC converter having a power plug which may be inserted into a recessed male socket carried by the enclosure, thereby allowing a power tool or other electrical load to be plugged into an AC socket for operation.

Another advantage of the present invention is to provide a mobile power center with self-retracting cord which includes a grommet which cleans the extension cord as it retracts, thereby preventing debris from entering the enclosure.

A still further advantage of the present invention is to provide a novel mobile power center with self-retracting cord which provides a female to female adapter connectable to the male plug of the extension cord, thereby allowing a power tool or other load to be powered by the 12 VDC to 120 VAC converter when plugged into female to female adapter at a remote location.

DRAWINGS

These and other features, aspects, and advantages of the present invention will become better understood with regard to the following description, appended claims, and accompanying drawings where:

DESCRIPTION

Referring in generally to FIGS. 1 through 9, a mobile power center with self-retracting cord 10 constructed in accordance with the principles of the invention is seen. An enclosure 20 provides a mounting surface which is attachable to the bumper of a vehicle and a front surface having a recessed area for attachment of a license plate. Within the enclosure, a reel assembly 50 carries an extension cord 70 on a spring-powered spindle that allows manual extension and automatic retraction of the cord. Where the length of the cord 70 exceeds the length which may be carried by the reel, first and second cord restraints 40, carried on opposed sides of the enclosure, support additional cord wrapped around the enclosure. The first and second three-prong sockets of a dual socket receptacle are wired in parallel to the inner end of the extension cord. In a first mode of operation, a block heater 200, mounted on the vehicle, may be plugged into a first socket, while a trouble light or tool may be plugged into the second socket. AC power from a remote source is supplied by the extension cord. In a second mode of operation, a 12 VDC to 120 VAC converter 100, mounted in the engine compartment and powered by the vehicle, may be plugged into a recessed male socket. A tool or light may then be plugged into an AC socket for operation. Where an electrical load is remotely located, the outer end of the extension cord may be extended, with a female to female adapter 80 attached, thereby providing power to the remote load.

An enclosure 20 is sized for mounting on the front bumper 302 of a vehicle 300 and for support of a license plate 301. The top 23, bottom 28, left side 27 and right side 24 define a region large enough to enclose an extension cord 70 and supporting reel assembly 50.

Figures 1, 2:
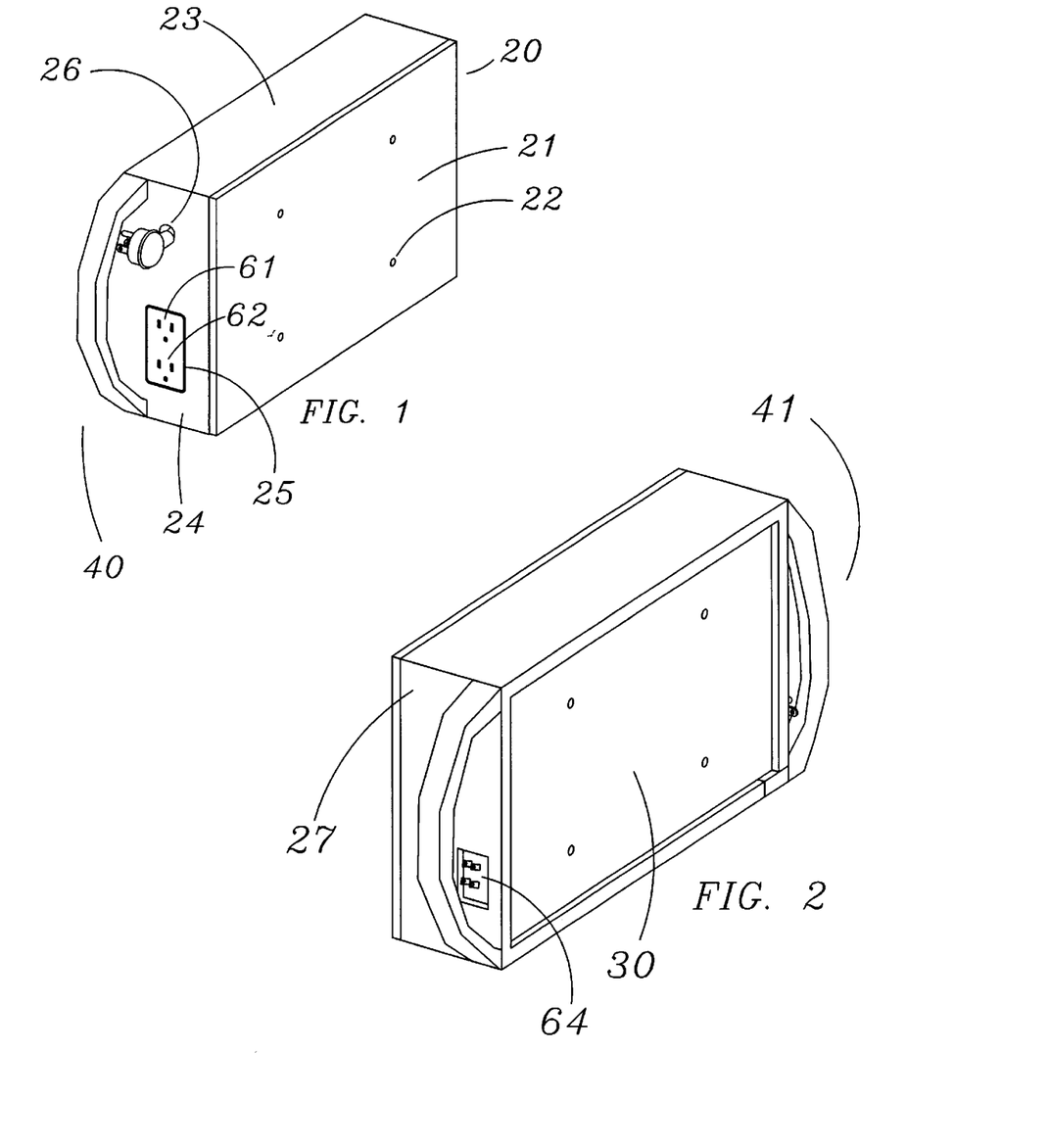
FIG. 1 is an isometric view of the enclosure, showing the top, right and rear sides.
FIG. 2 is an isometric view of the enclosure, showing the front, top and left sides.

As is best seen in FIG. 1, a mounting surface 21 on the rear of the enclosure provides structures to allow attachment to the vehicle's bumper, such as fastening holes 22. Bolts extend through the holes 22 and spacers 32 and into the bumper, securing the enclosure to the vehicle.

As is best seen in FIG. 2, a front surface 30 typically defines a recessed region sized to fit exactly around the perimeter of the license plate 301. Fastening holes 31 are located to match the holes on a standard license plate, allowing the plate to be secured in place using the same holes and bolts to secure the unit to the bumper.

Referring again to FIG. 1, a hole 25 is defined in the right side 24 of the enclosure to support the dual socket receptacle 60. A second hole 26 defined in the right side of the enclosure allows the extension cord 70 to extend from the inside of the enclosure.

Figure 5:
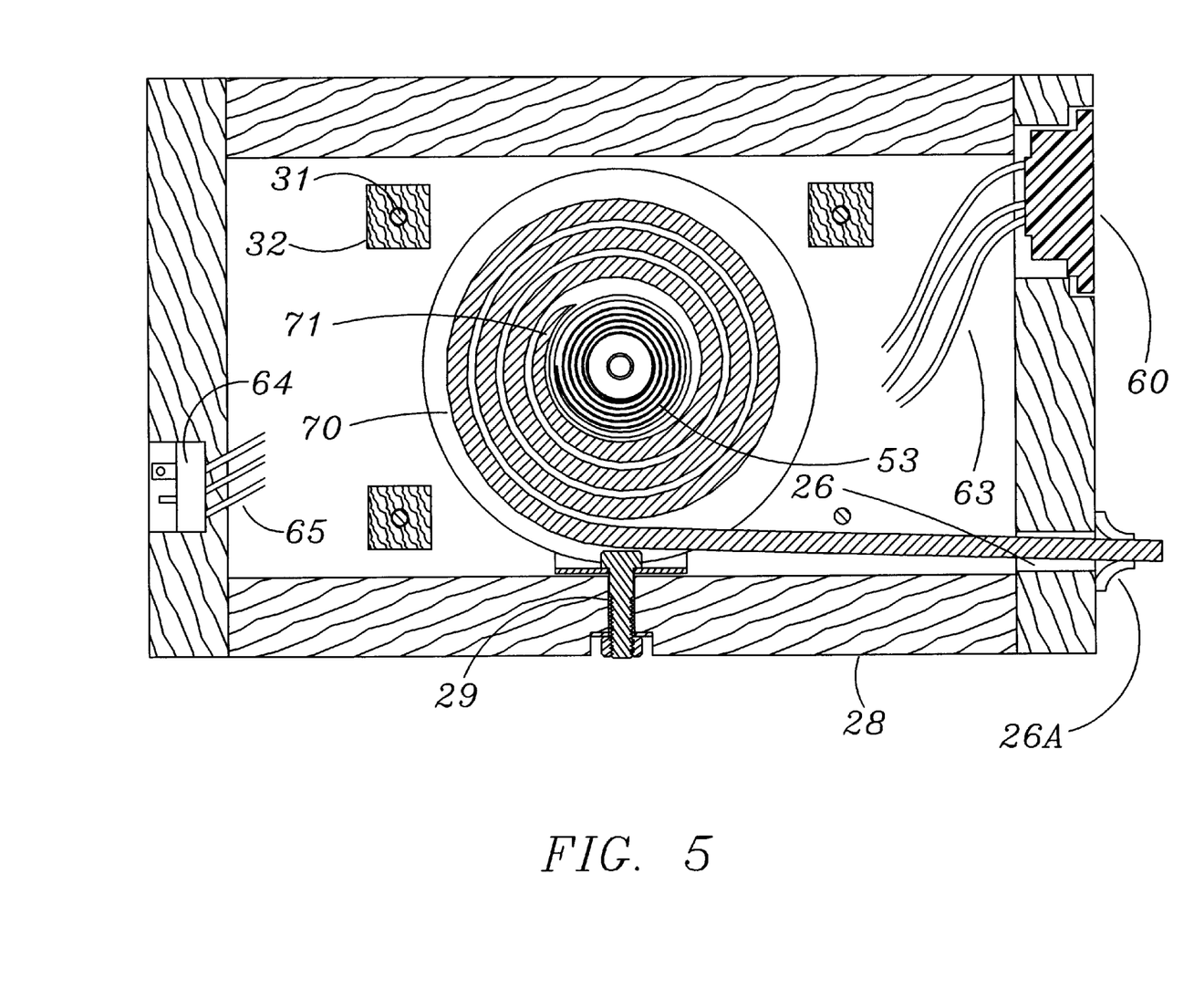
FIG. 5 is a lengthwise cross-sectional view of the enclosure, showing the reel and extension cord.

Referring to FIG. 5, a fastening hole 29 defined in the bottom surface 28 of the enclosure allows the reel 50 to be securely bolted onto the enclosure.

Figure 6:
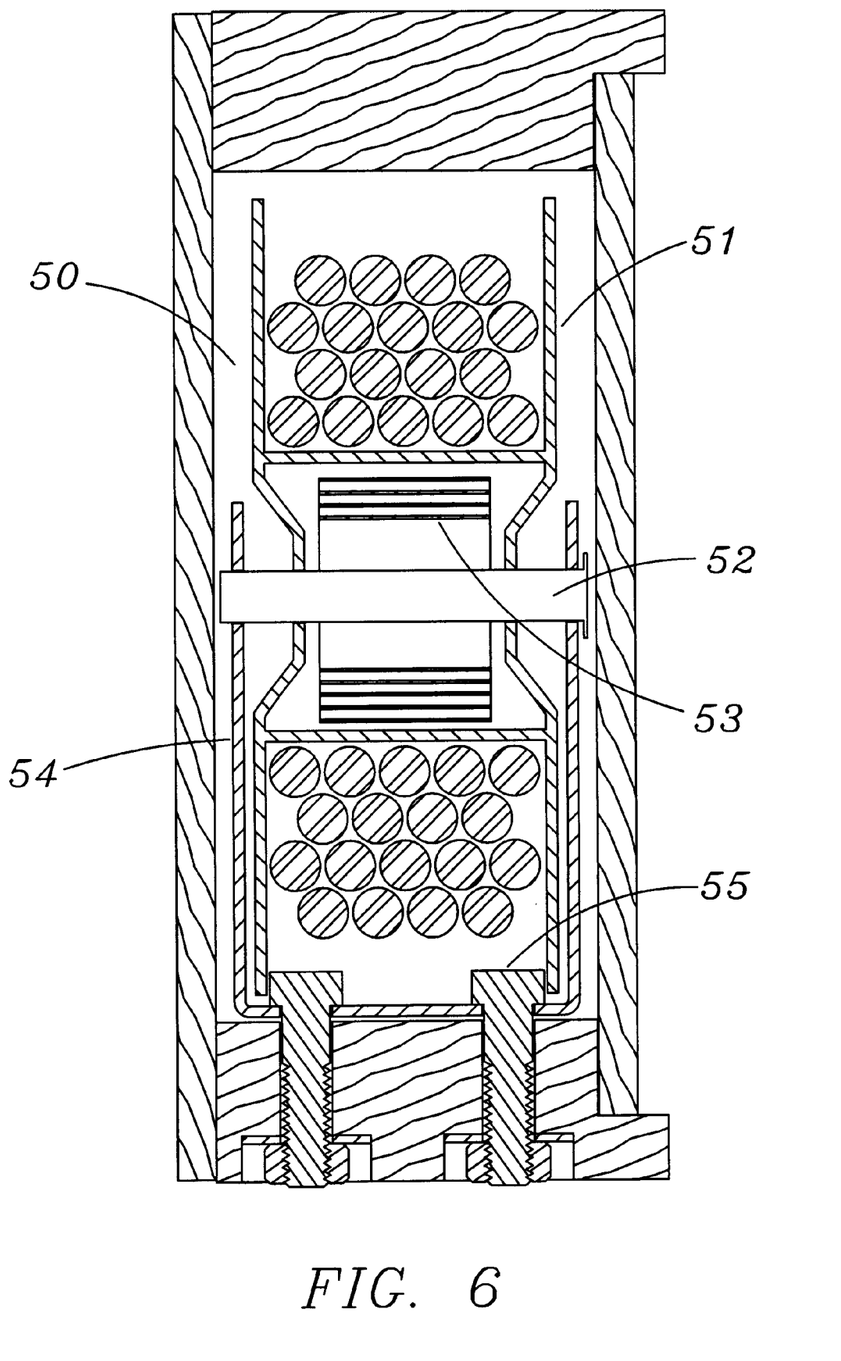
FIG. 6 is end-on cross-sectional view of the enclosure, showing the reel and extension cord.

As seen in the cross-sectional views of FIG. 5 and 6, a spring-loaded reel assembly 50 carries the extension cord 70. The reel assembly, which includes a frame, axle, spindle and spring, is carried within the enclosure. The reel assembly allows an extension cord 70 to be extended to a desired length, or retracted for storage. The spring is tightened as the extension cord is extended, thereby providing the power to automatically retract the cord back onto the spindle.

As seen in FIG. 6, a frame 54 is attached by bolts 55 or other fasteners to the bottom of the enclosure. Opposed arms of the frame support the opposite ends of an axle 52. A spindle 51 is sized for free rotation within the enclosure on the axle 52, and provides front and rear sidewalls between which the extension cord is coiled.

The spring 53 is best viewed in FIG. 5, where it is seen coiled about the axle 52 which supports the spindle 51. Because a first end of the spring is fixed to the enclosure and a second end of the spring is attached to the spindle, the spring assumes a relaxed state when the extension cord is fully retracted about the spindle, and a stressed state when the cord is extended from the spindle.

Figure 8:
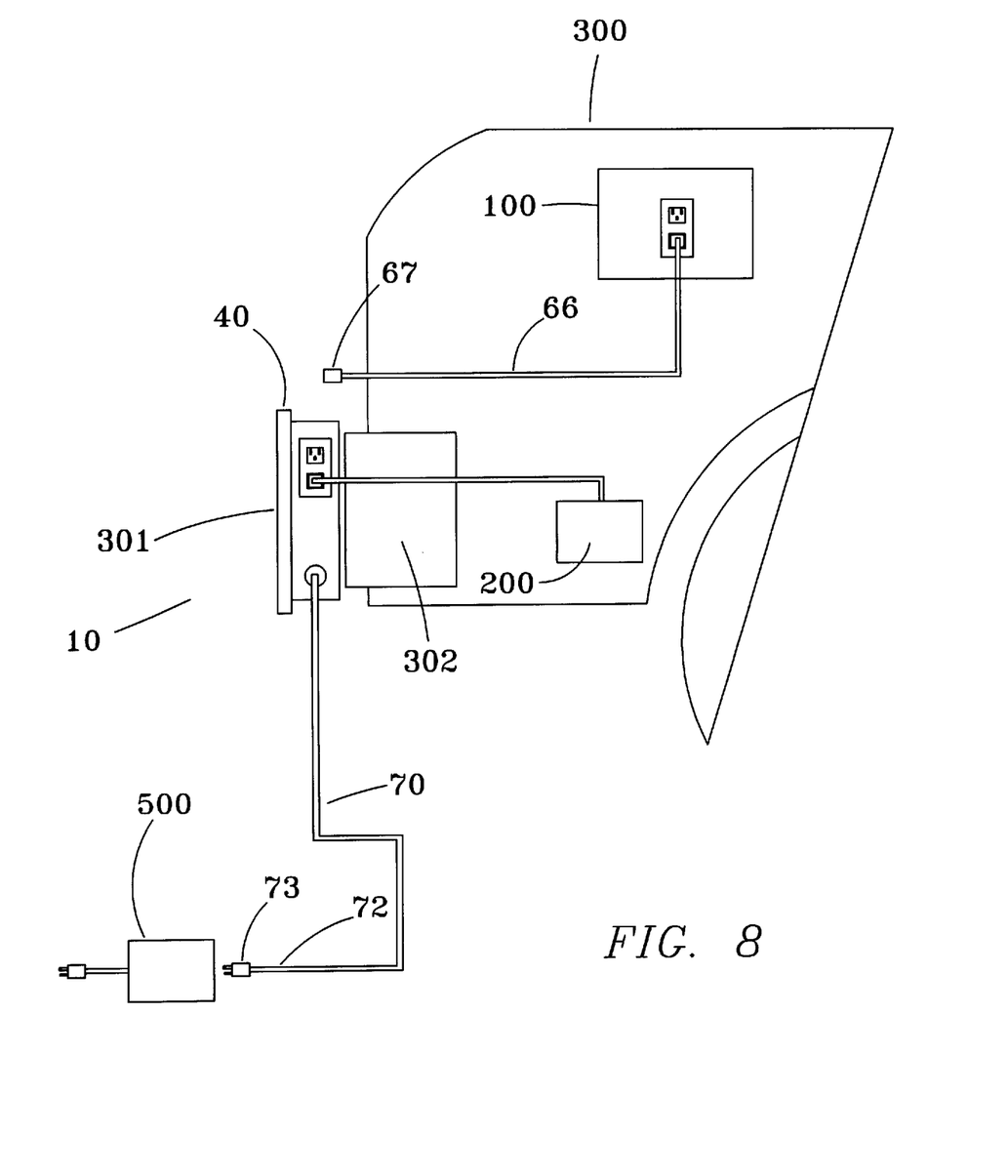
FIG. 8 is a somewhat diagrammatic view, showing the enclosure attached to the bumper of a vehicle, the 12 VDC to 120 VAC converter not currently electrically connected to the enclosure, the block heater electrically connected to the enclosure, and the showing the extension cord extended to reach an AC power source.

As seen in FIGS. 5 and 8, a self-cleaning grommet 26A is carried by the enclosure 20 at the hole 26 for the extension cord 70. The grommet is typically made of flexible material, such as rubber, plastic or resin. The grommet rubs against the cord as it extends and retracts, and thereby scrapes debris from the cord which prevents the debris from entering the enclosure. The motion of the cord against the grommet also tends to clean the grommet, making it self-cleaning.

Figure 7:
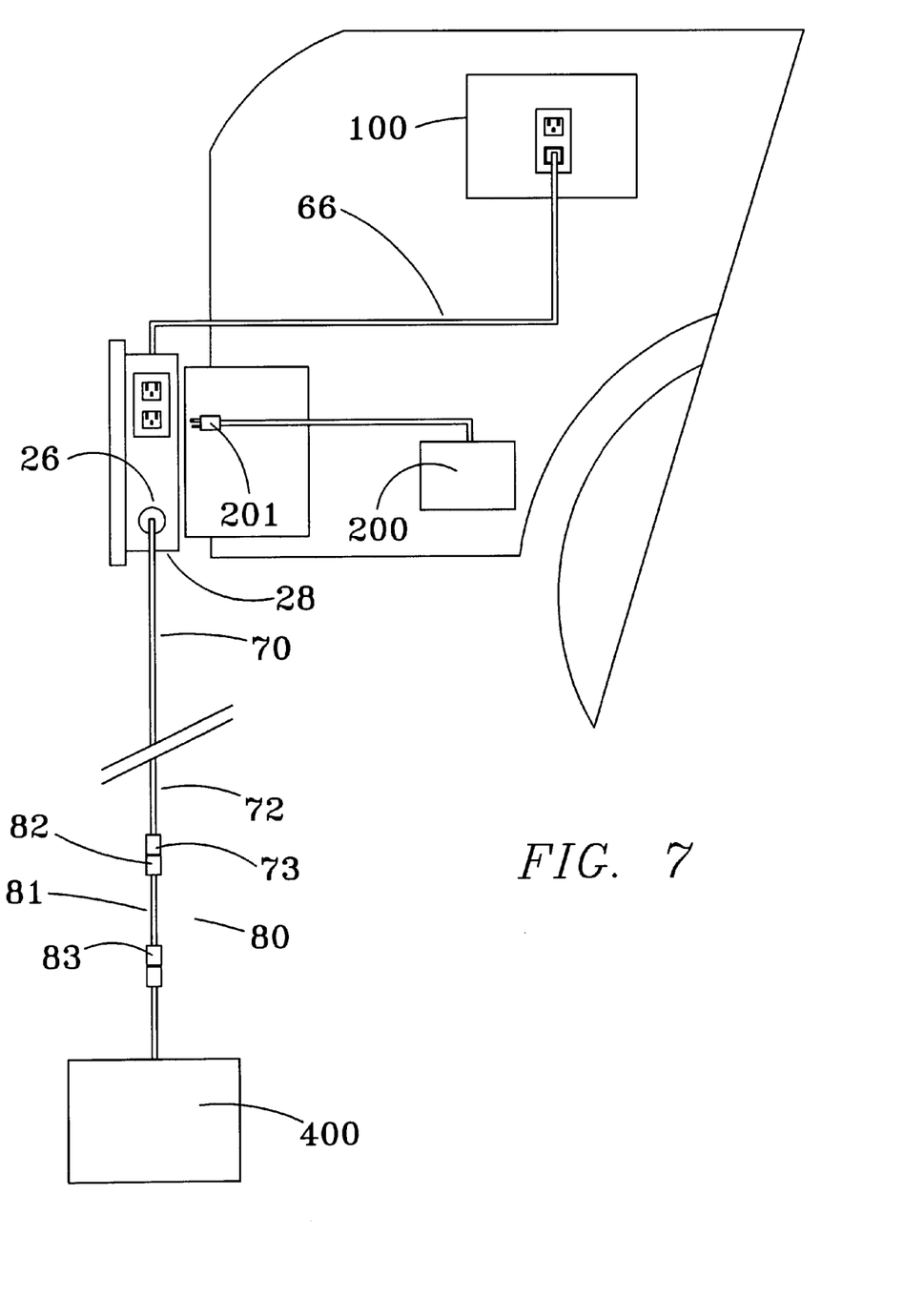
FIG. 7 is a somewhat diagrammatic view, showing the enclosure attached to the bumper of a vehicle, the 12 VDC to 120 VAC converter electrically connected to the enclosure, the block heater not currently electrically connected to the enclosure, and the showing a load attached to the female-to-female adapter carried by the extended extension cord.

As seen in the cross-sectional views of FIGS. 5 and 6, and the diagrammatic views of FIGS. 7 and 8, the extension cord 70 may be uncoiled from a retracted position wrapped about the spindle 51 to an extended position. In the extended position, the male end 73 of the outer end 72 of the cord may be plugged into an AC power source of an AC power-consuming electrical load.

Figure 3:
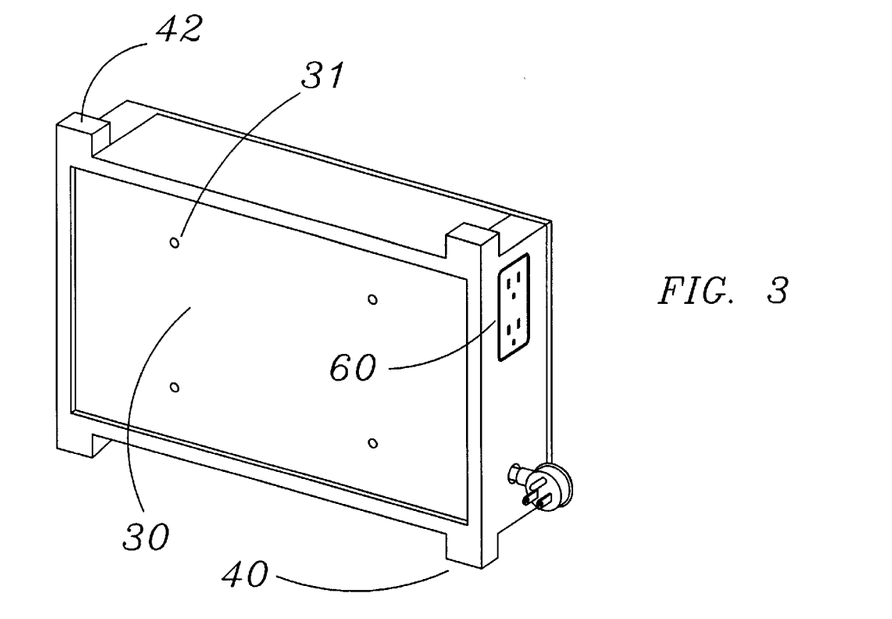
FIG. 3 is an isometric view of the enclosure, showing the front, top and right sides.

As seen in FIGS. 1, 3, and 5, a weather resistant dual socket receptacle 60 is carried in the right side panel of the enclosure. A preferred receptacle provides first and second standard, three-prong AC sockets 61, 62. Both sockets are electrically connected to the inner end 71 of the extension cord 70 by a three-wire harness 63, including line, neutral and ground wires.

Figure 5A:
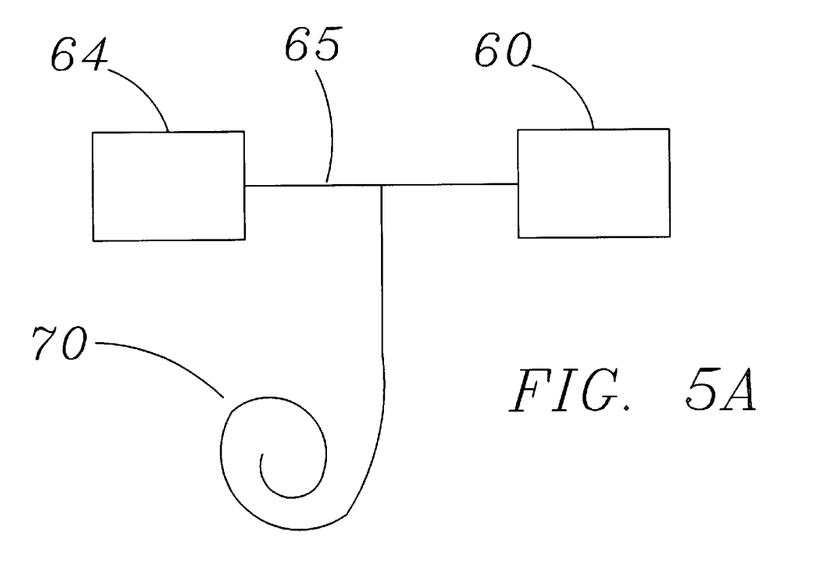
FIG. 5A is a presentation of an electrical connection among the male receptacle, the dual socket receptacle and the extension cord.

As seen in FIGS. 2 and 5, a weather resistant recessed male receptacle 64 is of a standard type adapted for insertion into the female socket of an electrical extension cord. As seen in FIG. 5A, a three-wire harness 65, extending from the receptacle, is in electrical communication with the extension cord 70 and with the dual socket receptacle 60.

In operation, the power converter 100 may be connected to the recessed male receptacle by a short extension cord 66, thereby allowing tools, lights or other electrical loads to be attached to the dual socket 60 or to the extension cord 70 adapted by the female-to-female adapter 80.

As seen in the diagrammatic views of FIGS. 7 and 8, a block heater 200 is mounted on the engine, typically in a location that allows heat flow into the engine block and oil pan. The block heater is typically attached in a semi-permanent manner; i.e. it could be removed at the end of the winter season, but typically is not.

Continuing to refer to FIGS. 7 and 8, an electrical plug 201 extends from the block heater, allowing the block heater to be plugged into standard 120 VAC power. The plug 201 is of a standard male three-prong AC plug type, and is carried by a cord which has a length sufficient to allow the plug to be installed in either of the sockets in the dual socket receptacle 60.

As seen in the diagrammatic views of FIGS. 7 and 8, a 12 VDC to 120 VAC converter 100 is mounted within the engine compartment, where it is connected to the 12 VDC and ground sides of the vehicle's electrical system. In a known manner, the converter 100 inputs 12 VDC and outputs 120 VAC. The 120 VAC is delivered from the converter by the female socket 67 of an extension cord 66 which may be inserted into one of the sockets 61, 62 of the dual socket receptacle 60.

Figure 4:
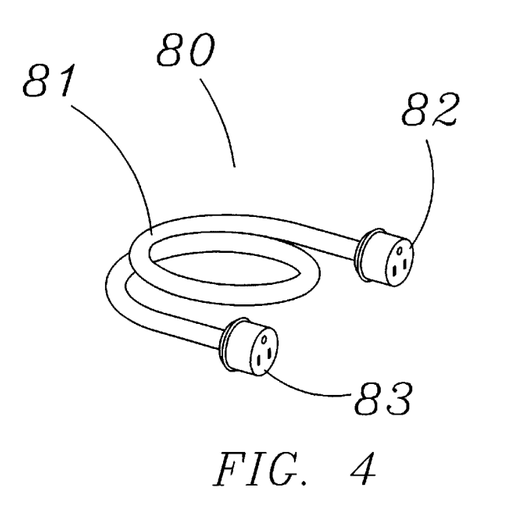
FIG. 4 is an isometric view showing the female-to-female adapter.
Figure 4A:
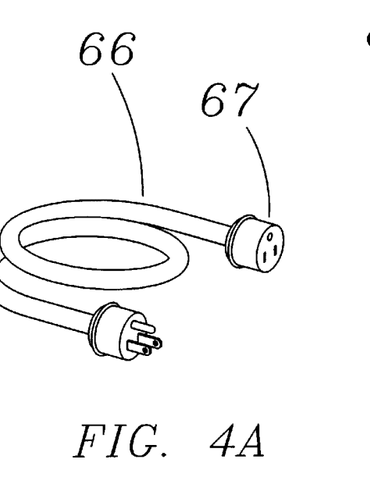
FIG. 4A is an isometric view of a short extension cord for use in connecting the 12 VDC to 120 VAC power converter to a recessed male plug in the enclosure.

A female to female adapter 80 allows the extension cord 70 to be used as a source of power for tools or other devices. Where the 12 VDC to 120 VAC converter is plugged into one socket of the dual receptacle 60 and a first socket 82 of the female to female adapter is plugged into the male plug 73 carried by the outer end 72 of the extension cord 70, a remote load such 400 as a power tool or other device may be plugged into the second socket 83 of the female to female adapter. The first and second sockets 82, 83 are electrically connected by a three-wire segment 81, having line, neutral and ground conductors.

Figure 9:
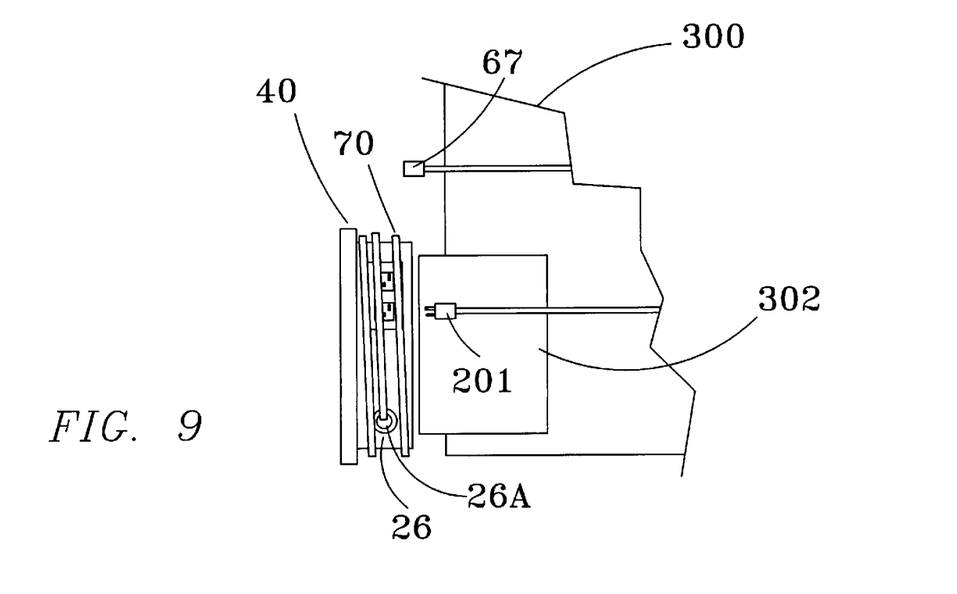

A preferred cord restraint 40 provides rounded handles 41 extending from the left and right sides 27, 24 of the enclosure 20. As seen in FIG. 9, where the length of the extension cord 70 is too long to be fully retracted onto the spindle of the reel assembly carried within the enclosure, the excess cord may be wrapped around the outside of the enclosure. In this circumstance, the excess cord is kept in place by the opposed handles 41 of the cord restraint 40.

As seen in FIG. 3, an alternative embodiment of the cord restraint provides upper and lower stubs 42 which extend sufficiently from the top and bottom surfaces of the enclosure to retain excess cord when wrapped about the enclosure.

In a first mode of operation, the mobile power center with self-retracting cord may be used to supply 120 VAC power to the block heater 200 when the AC plug to be used is located a distance from the parked vehicle. Referring to FIG. 8, it can be seen that the power plug 201 of the block heater is plugged into the first socket 61 of the dual socket receptacle 60. The extension cord is extended from the reel assembly until there is sufficient length to allow the male plug 73 to be plugged into the available AC wall socket. Power flows through the extension cord and into the dual socket receptacle. Since the block heater is plugged into the dual socket receptacle, it becomes operational. An additional electrical load, such as a trouble light or power tool, may also be plugged into the unused socket in the dual socket receptacle.

A timer 500, seen in FIG. 8, optionally receives the male plug 73, allowing the time during which heat is applied to the engine to be controlled.

In a second mode of operation, the 12 VDC to 120 VAC converter 100 is operated, sometimes requiring the engine of the vehicle to be running. Referring to FIG. 7, the extension cord 66 provides an electrical connection between the recessed male receptacle and the converter 100. The extension cord is extended from the reel assembly until there is sufficient length to reach the remote load 400. The male plug 73 is then inserted into a first female socket 82 on the female to female adapter 80. The load is then plugged into the second female socket 83. An additional load, not remote from the vehicle, may also be plugged into the second socket 62 of the dual socket receptacle. Power flows from the 12 VDC to 120 VAC converter into recessed male receptacle which is in electrical communication with the extension cord. The female to female adapter, carried by the end of the extension cord, allows a load having a standard male plug to be operated.

The previously described versions of the present invention have many advantages, including a primary advantage of providing a novel mobile power center with self-retracting cord having an enclosure which conceals an electrical extension cord within an attractive license plate holder, and which allows the electrical cord to be extended as needed to reach an AC socket, and which provides an AC socket into which may be plugged one or more block heaters.

Another advantage of the present invention is to provide a mobile power center with self-retracting cord which includes a grommet which cleans the extension cord as it retracts, thereby preventing debris from entering the enclosure.

Another advantage of the present invention is to provide a mobile power center with self-retracting cord which provides a 12 VDC to 120 VAC converter having a power plug which may be inserted into a recessed male socket carried by the enclosure, thereby allowing a power tool or other electrical load to be plugged into an AC socket for operation.

A still further advantage of the present invention is to provide a novel mobile power center with self-retracting cord which provides a female to female adapter connectable to the male plug of the extension cord, thereby allowing a power tool or other load to be powered by the 12 VDC to 120 VAC converter when plugged into female to female adapter at a remote location.

The invention resides not in any one of these features per se, but rather in the particular combination of all of them herein disclosed and claimed and it is distinguished from the prior art in this particular combination of all of its structures for the functions specified.

Although the present invention has been described in considerable detail and with reference to certain preferred versions, other versions are possible. For example, while a preferred cord restraint 40 has been illustrated, it is clear that alternative structures conforming to the teachings of this disclosure could be substituted. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A mobile power center with self-retracting cord, comprising:
   (A) an enclosure having a surface sized for mounting of a vehicle license plate;
   (B) a spindle, carried within the enclosure;
   (C) an extension cord having a male plug, carried by the spindle;
   (D) a dual socket receptacle, carried by the enclosure and adapted for insertion of two standard, three-prong AC plugs, wherein both sockets of the dual receptacle are electrically connected to an inner end of the extension cord;
   (E) a recessed male receptacle, carried by the enclosure and adapted for connection to a standard female extension cord socket, wherein the recessed male receptacle is electrically connected to the dual socket receptacle; and
   (F) a cord restraint having first and second rounded handles carried by opposed first and second sides of the enclosure.

2. The mobile power center with self-retracting cord of claim 1, additionally comprising a block heater having an electrical plug adjacent to a first socket of the dual socket receptacle.

3. The mobile power center with self-retracting cord of claim 1, additionally comprising a grommet, carried by the enclosure adjacent to a hole defined in the enclosure for passage of the extension cord.

4. The mobile power center with self-retracting cord of claim 1, additionally comprising:
   (A) a 12 VDC to 120 VAC converter having a power supply plug adjacent to the recessed male receptacle;
   (B) a recessed male plug, in electrical communication with the dual socket receptacle; and
   (C) a female to female adapter, having first and second female sockets, the first socket attached to the male plug of the extension cord.

5. A mobile power center with self-retracting cord, comprising:
   (A) an enclosure having a surface sized for the mounting of a vehicle license plate;
   (B) a spindle, carried within the enclosure;
   (C) an extension cord having a male plug, carried by the spindle;
   (D) a dual socket receptacle adapted for insertion of two standard, three-prong AC plugs, wherein both sockets of the dual socket receptacle are electrically connected to an inner end of the extension cord, the dual socket receptacle carried by the enclosure;
   (E) a block heater having an electrical plug adjacent to a recessed male receptacle electrically connected to the dual socket receptacle;
   (F) a 12 VDC to 120 VAC converter having a power supply plug adjacent to a second socket of the dual socket receptacle;
   (G) a female to female adapter, having first and second female sockets, the first socket attached to the male plug of the extension cord; and
   (H) a cord restraint having first and second rounded handles carried by opposed sides of the enclosure.

* * * * *